United States Patent
Kurosawa

(10) Patent No.: US 7,182,529 B2
(45) Date of Patent: Feb. 27, 2007

(54) CAMERA HAVING A MIRROR BOX

(75) Inventor: Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 226 days.

(21) Appl. No.: 11/042,185

(22) Filed: Jan. 26, 2005

(65) Prior Publication Data

US 2005/0163499 A1    Jul. 28, 2005

(30) Foreign Application Priority Data

Jan. 27, 2004    (JP)    ............................. 2004-018075

(51) Int. Cl.
*G03B 19/12*    (2006.01)

(52) U.S. Cl. ...................... 396/358; 396/535; 396/541; 348/374

(58) Field of Classification Search ................ 396/354, 396/358, 535, 541
See application file for complete search history.

(56) References Cited

U.S. PATENT DOCUMENTS

| | | | | |
|---|---|---|---|---|
| 4,245,893 | A | * | 1/1981 | Lafont et al. ................ 359/876 |
| 4,264,170 | A | * | 4/1981 | Kurei .......................... 396/447 |
| 4,417,796 | A | * | 11/1983 | Sugiura et al. ............. 396/357 |
| 5,369,456 | A | | 11/1994 | Yokota ........................ 396/378 |
| 6,583,819 | B2 | | 6/2003 | Ito et al. ...................... 348/335 |
| 6,665,016 | B2 | | 12/2003 | Saitoh ......................... 348/374 |
| 6,741,284 | B1 | | 5/2004 | Shono ......................... 348/349 |
| 2005/0024528 | A1 | | 2/2005 | Kurosawa ................... 348/375 |
| 2005/0024529 | A1 | | 2/2005 | Kurosawa ................... 348/375 |
| 2005/0025475 | A1 | | 2/2005 | Kurosawa ................... 396/358 |
| 2005/0025479 | A1 | | 2/2005 | Kurosawa ................... 396/535 |

FOREIGN PATENT DOCUMENTS

JP    2003-69886    3/2003

OTHER PUBLICATIONS

U.S. Appl. No. 11/042,175, filed Jan. 26, 2005.
"Characterstics of Stainless Steel: A Comparison with Other Materials", Japanese Stainless Association, downloaded from http://www.jssa.gr.jp, including a date thereon of Jan. 21, 2005, together with a partial English language translation of the same.

* cited by examiner

*Primary Examiner*—W. B. Perkey
(74) *Attorney, Agent, or Firm*—Greenblum & Bernstein, P.L.C.

(57) ABSTRACT

A camera includes a mirror box to which a photographing lens is mounted, an object image being formed on one of an image pick-up device and sensitive film via the photographing lens; a main frame, the mirror box being provided on the main frame; and a shock absorbing device. The one of the image pick-up device and the sensitive film is supported by the mirror box, and the mirror box is supported by the main frame via the shock absorbing device.

13 Claims, 9 Drawing Sheets

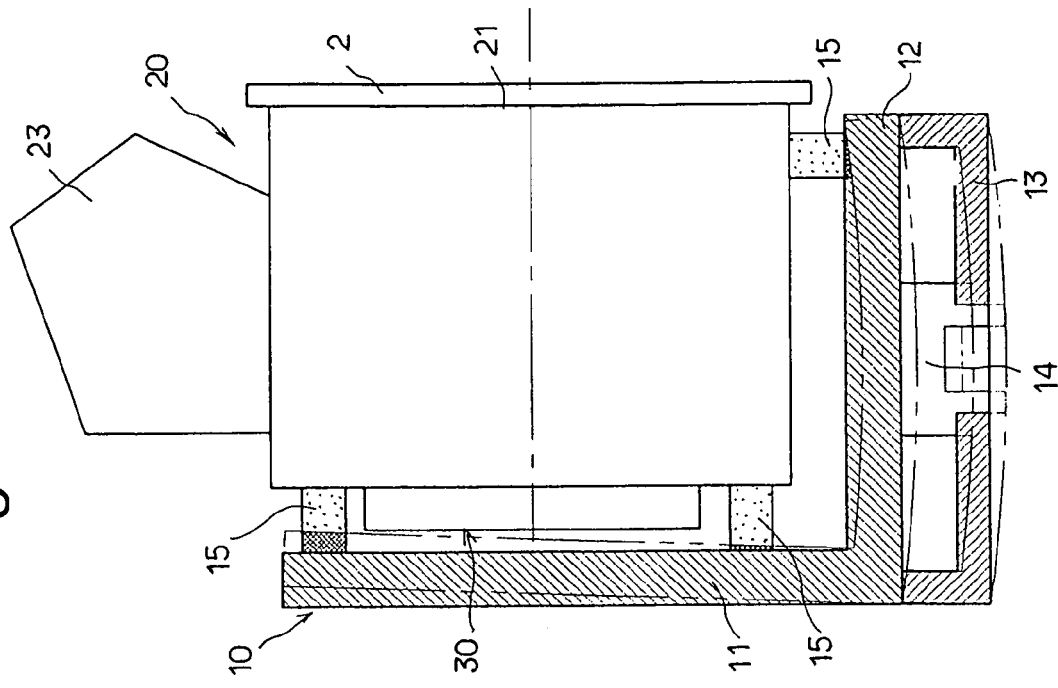
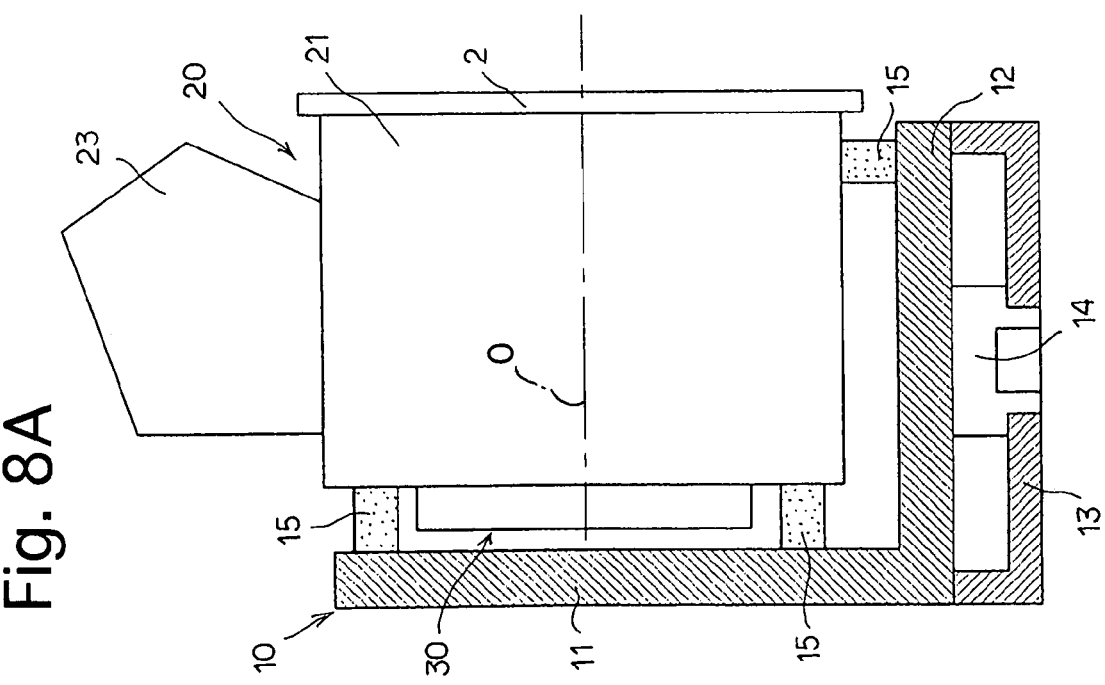

CAMERA HAVING A MIRROR BOX

BACKGROUND OF THE INVENTION

1. Field of the Invention

The present invention relates to a camera including an image pick-up device such as a CCD image sensor or a photosensitive film, for photographic use, and more specifically relates to such a camera having a structure. preventing a mirror box of the camera, which supports an optical element such as a quick-return mirror, from being deformed, especially by external forces.

2. Description of the Related Art

In digital cameras including an image pick-up device such as a CCD image sensor or conventional cameras using photosensitive film, for photographic use, a mirror-box fixing structure wherein a main frame in a camera body is made of a material possessing a high stiffness such as a stainless steel and wherein a resin-molded or die-cast mirror box is fixed to the front of the main frame has been proposed for miniaturization and weight reduction of the camera. In the case where a digital camera adopts such a structure, an image pick-up device is fixed to the back of the main frame. FIG. 10A shows a schematic view of a digital camera having such a mirror-box fixing structure. This digital camera is provided with a main frame 110 having an L-shaped vertical cross section. The main frame 110 is composed of a back plate 111 and a bottom plate 112 which are made of stainless steel plate and formed either separately or integrally. A die-cast mirror box assembly 120 is fixed on the main frame 110 by set screws 131 to be supported by the main frame 110. The mirror box assembly 120 is constructed so that various kinds of components such as a pentagonal prism 123 is mounted to a mirror box 121 of the mirror box assembly 120 and so that a lens mount 102, to which a photographing lens (not shown) is detachably attached, is provided on the front of the mirror box 121. In addition, the main frame 110 is provided on the back plate 111 with an aperture 111a through which the interior of the mirror box assembly 120 is exposed to the outside on the rear side thereof, and an image pick-up device 130 is fixed to a rear surface of the back plate 111 to face the aperture 111a. This arrangement makes it possible to miniaturize the camera and reduce the weight of the camera while increasing the strength of the camera body by a greater degree than in the case where the whole camera body is die-cast of aluminum or molded out of resin. This type of camera structure, in which an image pick-up device such as a CCD image sensor is fixed to a housing, which holds a photographing lens, via a fixing plate (i.e. the back plate 111) is disclosed in Japanese laid-open patent publication No. 2003-69886.

In the digital camera having such construction, it is generally the case that a bottom decorative member 113, that serves as a bottom cover of the camera body, is fixed to the bottom plate 112 of the main frame 110 to be integral therewith, and that a tripod socket (screw hole) 114, accessible through a hole formed on the bottom decorative member 113, is fixed to the bottom plate 112. When the digital camera is mounted on the pan head (camera platform) of a tripod, an external force applied to the tripod socket 114 is transferred to the bottom plate 112 of the main frame 110 as shown by two-dot chain lines in FIG. 10B. The main frame 110 is made of a metal plate having a high stiffness such as a stainless steel so as not to be easily deformed by a certain degree of external force. However, if a mounting screw (male screw) of a tripod which is screwed into the tripod socket 114 is tightened excessively, the external force applied to the bottom plate 112 via the tripod socket 114 becomes considerable, and accordingly occurrence of slight deformation in the main frame 110 cannot be avoided.

If such a deformation of the main frame 110 due to excessive tightening of the tripod's mounting screw causes the back plate 111 to be deformed as shown by two-dot chain lines in FIG. 10B, an imaging surface (sensitive surface) of the image pick-up device 130 that is fixed to the back plate 111 tilts relative to a plane orthogonal to a photographing optical axis O, which causes defocusing. Additionally, the deformation of the main frame 110 causes the mirror box 121 that is fixed to the main frame 110 to be deformed. The mirror box 121 is easier to be deformed than the main frame 110 because the mirror box 121 is made of a material having a relatively low stiffness such as die-cast aluminum, glass-reinforced polycarbonate resin or other resin, and accordingly the lens mount 102 that serves as an element of the mirror box assembly 120 deviates from the original position. In the above described particular case where the mirror box assembly 120 is fixed to the bottom plate 112 of the main frame 110, a deformation of the bottom plate 112 causes a lower portion of the mirror box assembly 120 to be deformed as shown by two-dot chain lines in FIG. 10B. As a result, the front surface of the lens mount 102 tilts upwards, which in turn causes the photographing optical axis O to tilt upwards, thus causing partial defocusing of the image focused on the image pick-up device.

In addition, mechanical vibrations are created by operations of camera mechanisms installed on the mirror box assembly 120 such as an AF drive mechanism and a shutter charge mechanism during a photographic operation. Such vibrations are transmitted to the main frame 110 via the mirror box assembly 120, and the main frame 110 vibrates sympathetically (resonates) to produce vibrational noise from the camera body, which increases operating noise of the camera. The aforementioned defocusing problem arises not only in digital cameras but also in conventional cameras using sensitive film, wherein a deformation of the main frame causes a sensitive surface of film to be deformed, thus causing defocusing; moreover, the aforementioned operational noise problem arises also in conventional cameras using sensitive film.

SUMMARY OF THE INVENTION

The present invention provides a camera having a mirror box, wherein defocusing caused by deformation of a main frame of the camera to which the mirror box is fixed is prevented from occurring while the operational noise of the camera is reduced.

According to an aspect of the present invention, a camera is provided, including a mirror box to which a photographing lens is mounted, an object image being formed on one of an image pick-up device and sensitive film via the photographing lens; a main frame, the mirror box being provided on the main frame; and a shock absorbing device. The one of the image pick-up device and the sensitive film is supported by the mirror box, and the mirror box is supported by the main frame via the shock absorbing device.

It is desirable for the mirror box to include a lens mount to which the photographing lens is mounted, at least one camera mechanism of the camera for performing a photographing operation, the camera mechanism being mounted to the mirror box to be integral therewith.

It is desirable for the main frame to include a back plate lying in a plane orthogonal to an optical axis of the photographing lens; and a bottom plate which extends in the optical axis direction. The mirror box is supported by both the back plate at a plurality of points thereon and the bottom plate at a plurality of points thereon via the shock absorbing device.

It is desirable for the shock absorbing device to include a resilient member positioned between the mirror box and the main frame; and a connecting device which connects the resilient member to each of the mirror box and the main frame so that the resilient member remains positioned between the mirror box and the main frame.

It is desirable for the resilient member to be a hollow cylindrical bush, and for the connecting device to be a screw which passes through the hollow cylindrical bush and is screwed into the mirror box.

It is desirable for an annular groove to be formed on an outer peripheral surface of the hollow cylindrical bush, the hollow cylindrical bush being fitted into a fixing hole formed on the main frame so that an inner edge of the fixing hole is engaged in the annular groove.

The resilient member can be a compression coil spring, and the connecting device can be a screw which passes through the compression coil spring and is screwed into the mirror box.

The resilient member can be a solid column, and the connecting device can include two end plates fixed to opposite ends of the solid column, at least one first screw for fixing one of the two end plates to the mirror box, and at least one second screw for fixing the other of the two end plates to the main frame.

The image pick-up device can be a CCD image sensor or a CMOS image sensor.

It is desirable for the camera to include a quick-return mirror installed in the mirror box.

It is desirable for the shock absorbing device to include a plurality of shock absorbers via which the mirror box is supported by the main frame at different points.

It is desirable for the camera mechanism to include at least one of an AF mechanism, a shutter mechanism and a diaphragm drive mechanism.

In an embodiment, a digital camera is provided, including a main frame; a mirror box installed on the main frame, and having a lens mount to which an interchangeable lens is detachably attached; and a plurality of shock absorbers positioned between the mirror box and the main frame so that the mirror box is supported by the main frame via the plurality of shock absorbers at different points.

According to the present invention, even if an external force is applied to the camera body to a degree that the main frame is deformed or the main frame vibrates due to impact or shock given to the camera body, the mirror box is prevented from being deformed or vibrating by the shock absorbing device so that the mirror box is not deformed or vibrates. Accordingly, defocusing which may be caused by a deformation of the mirror box and image shake which may be caused by vibrations of the mirror box can be prevented from occurring, which makes high-quality imaging operation possible. In addition, mechanical vibrations which are created by operations of mechanisms installed on the mirror box during a photographic operation can be absorbed by the shock absorbing device to thereby be prevented from being transmitted to the main frame, which decreases operating noise of the camera.

The present disclosure relates to subject matter contained in Japanese Patent Applications No. 2004-18075 (filed on Jan. 27, 2004) which is expressly incorporated herein by reference in its entirety.

BRIEF DESCRIPTION OF THE DRAWINGS

The invention will be discussed below in detail with reference to the accompanying drawings, in which:

FIGS. 8A and 8B are schematic diagrams illustrating an operation ensuring an in-focus state;

DESCRIPTION OF THE PREFERRED EMBODIMENTS

Figure 1:
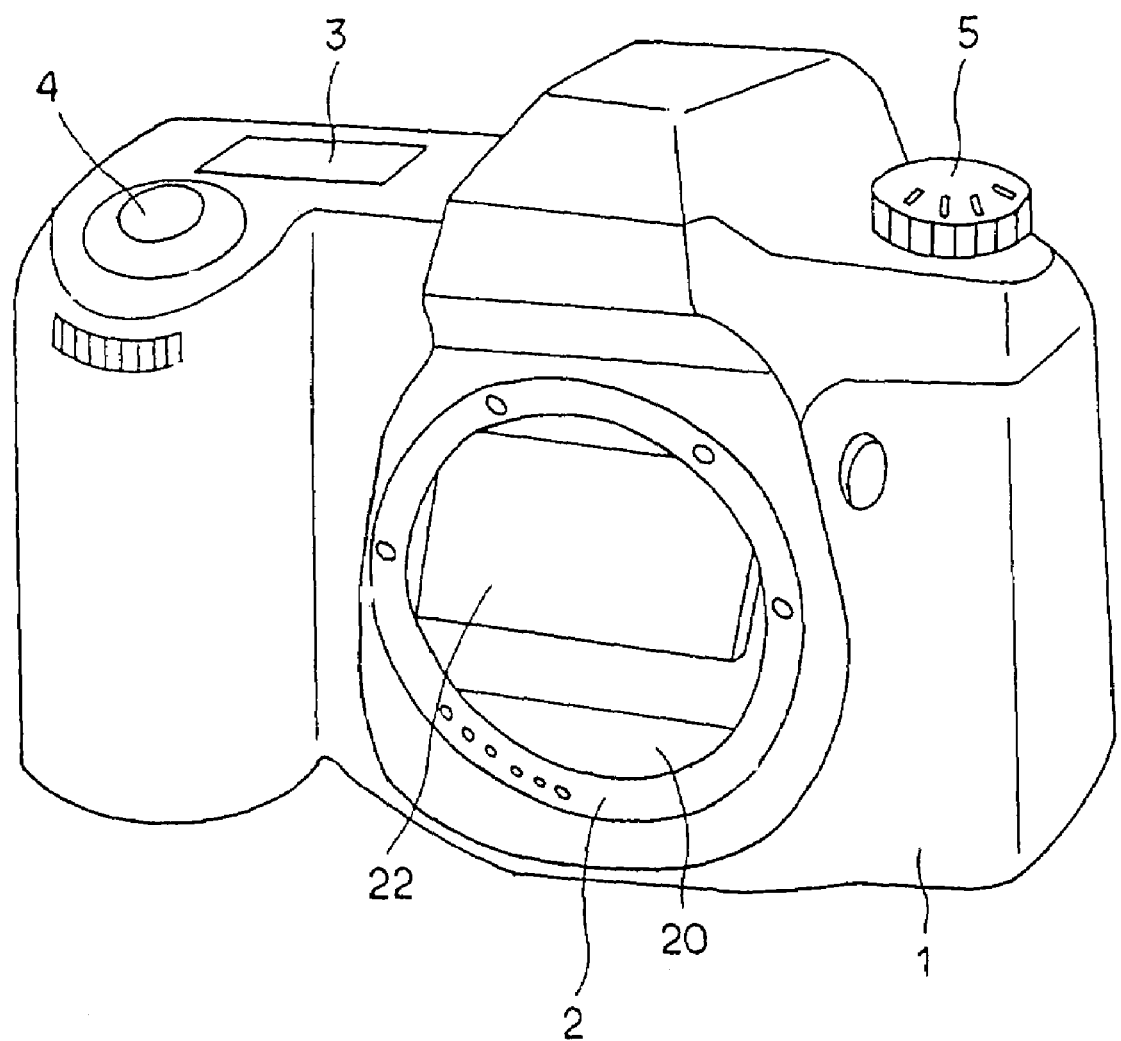
FIG. 1 is a perspective external view of an embodiment of a digital camera (camera body) according to the present invention.

FIG. 1 is a perspective external view of an embodiment of an SLR digital camera to which the present invention is applied, viewed obliquely from the right front side of the digital camera. The digital camera 100 that is constructed as an SLR digital camera is provided on the front of a camera body 1 thereof with a lens mount (lens mount ring) 2, to which an interchangeable lens (not shown) is detachably attached. The digital camera 100 is provided on top of the camera body 1 with an LCD indicating portion 3, a release button 4 and a select dial (dial switch) 5. The camera body 1 is provided on the bottom thereof with a tripod socket (screw hole) 14 (see FIGS. 8A and 8B; not shown in FIG. 1), so that the digital camera 100 is mounted on a tripod (not shown).

Figure 2:
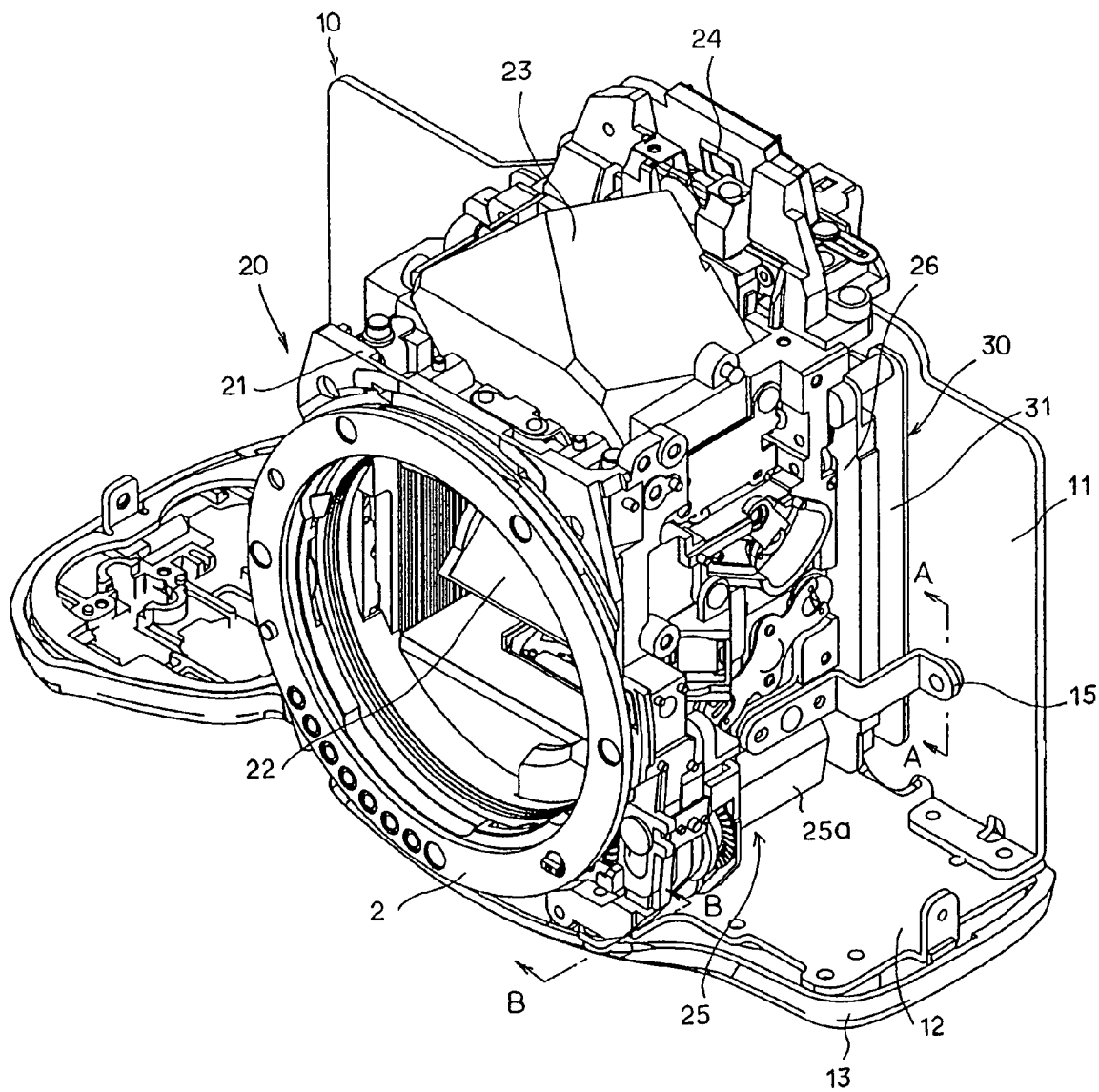
FIG. 2 is a perspective view of components of an internal structure of the digital camera shown in FIG. 1, viewed obliquely from the right front side of the digital camera.
Figure 3:
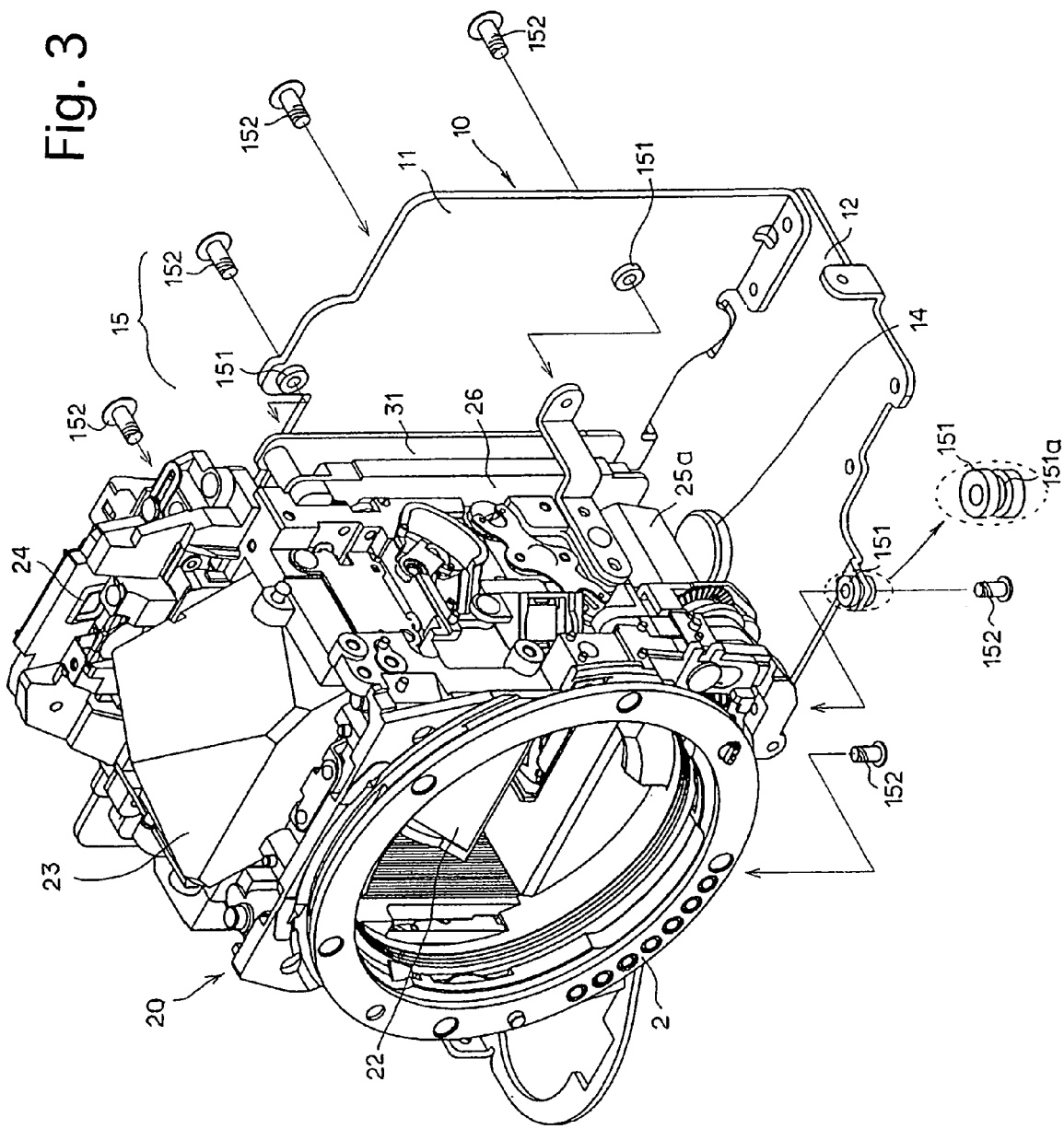
FIG. 3 is an exploded perspective view of a main frame and a mirror box assembly of the digital camera shown in FIG. 1.

FIG. 2 is a perspective view of components of an internal structure of the digital camera 100 that include a main frame 10, a mirror box assembly 20 and a CCD unit 30, and FIG. 3 is an exploded perspective view of a portion of the digital camera 100 shown in FIG. 2. The main frame 10 is made of a metal plate having a high stiffness such as stainless steel, and consists of a back plate 11, a bottom plate 12 and two side plates (a right-side plate and a left-side plate; not shown) which are joined together by swaging or welding. Specifically, the back plate 11 and the bottom plate 12 are joined together to have an L-shaped vertical cross section.

Figure 6:
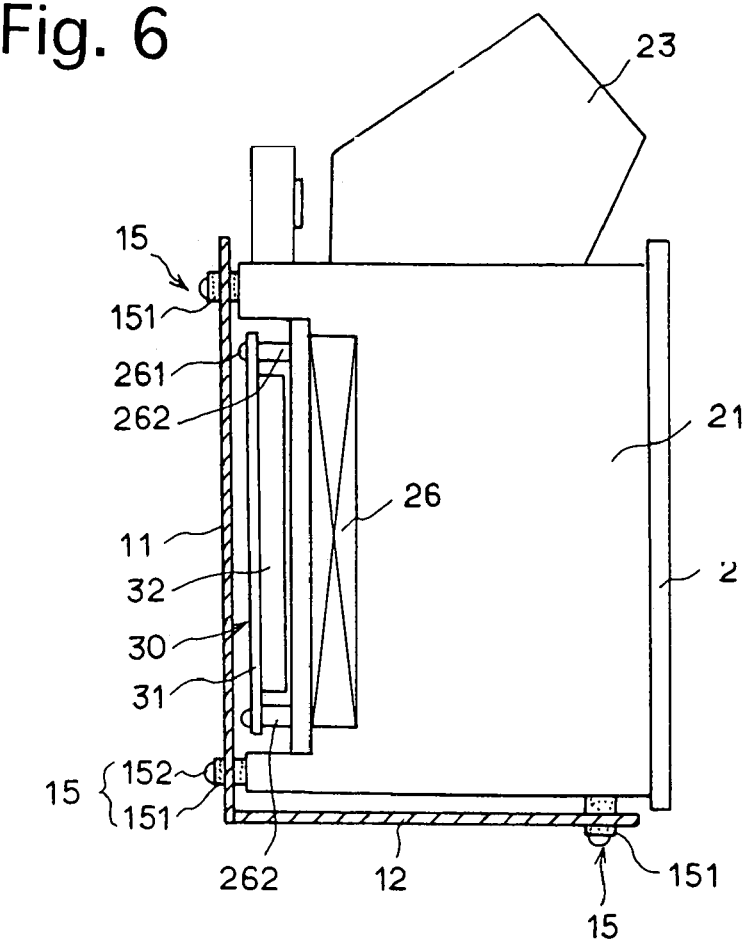
FIG. 6 is a schematic vertical sectional view of the internal structure of the digital camera shown in FIG. 1.

The back plate 11 extends vertically, and the bottom plate 12 is elongated horizontally along the bottom edge of the back plate 11, and extends in an optical axis direction (direction of the optical axis O; i.e., the horizontal direction as viewed in FIG. 6). The mirror box 21 that serves as a major part of the mirror box assembly 20 is die-cast of aluminum or made of fiber-glass reinforced polycarbonate resin, and is formed into a rectangular box shape. The lens mount 2 is formed integral with the front of the mirror box 21.

Figure 4:
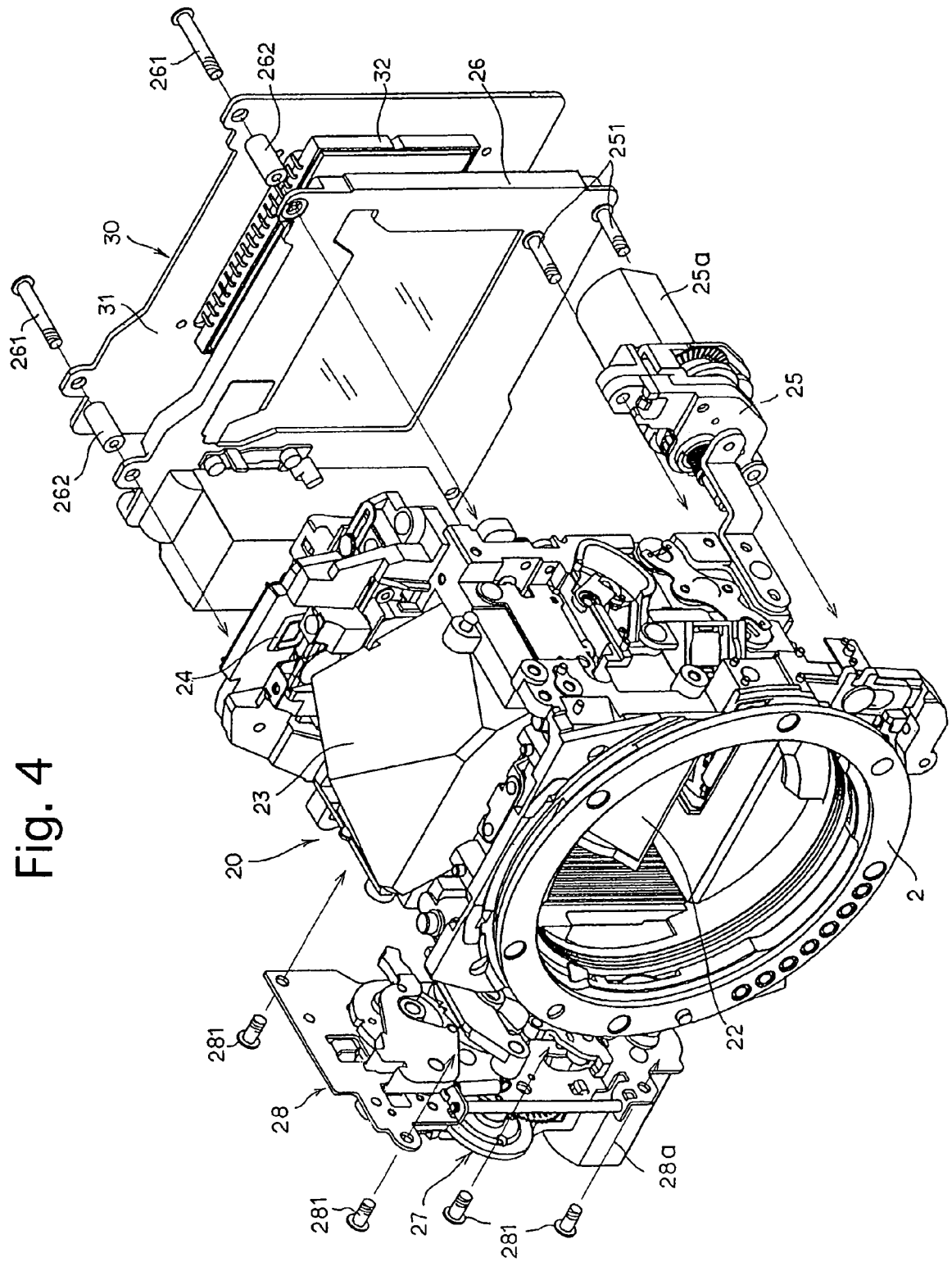
FIG. 4 is an exploded perspective view of portions of the mirror box assembly shown in FIGS. 2 and 3.
Figure 5:
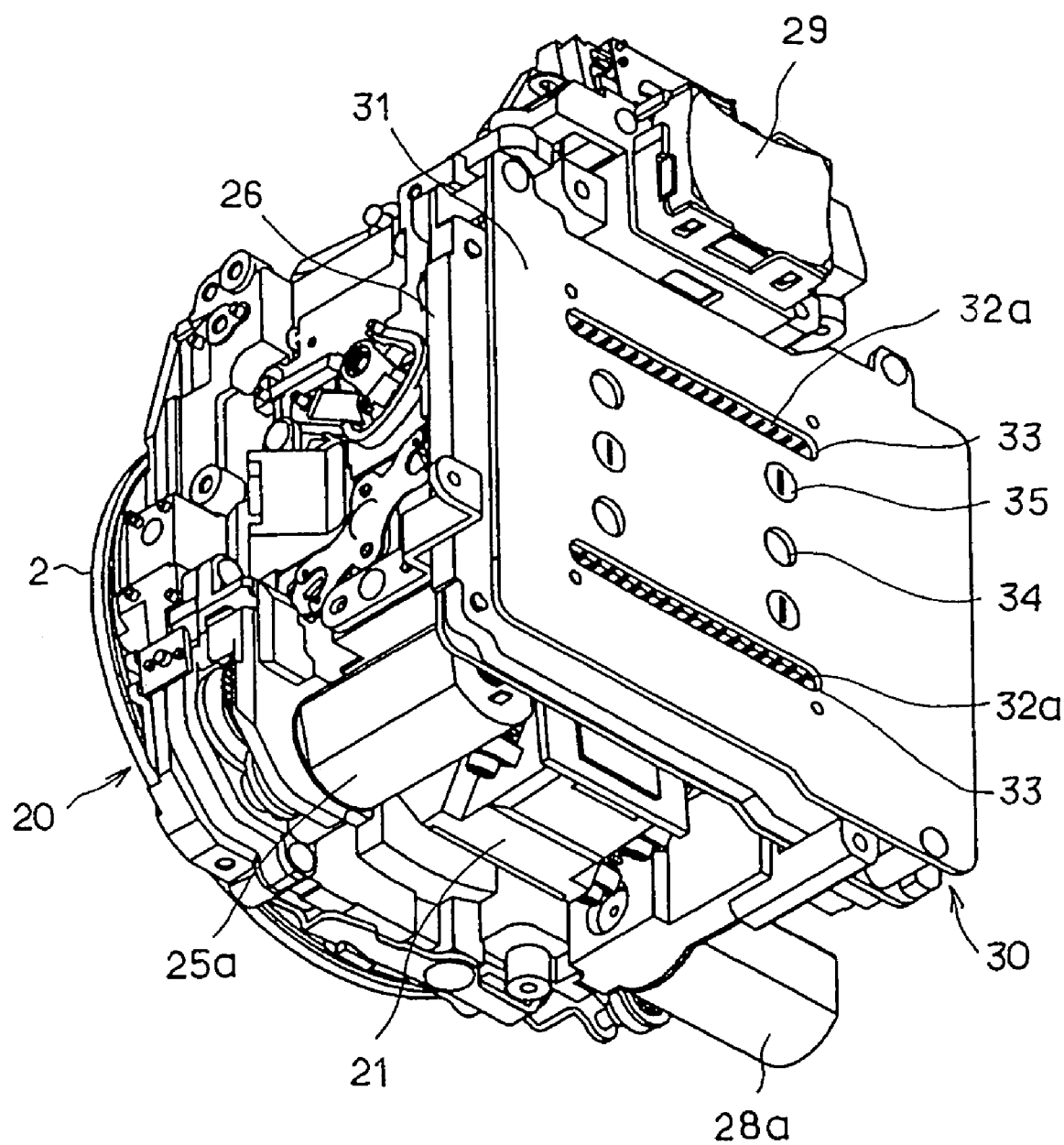
FIG. 5 is a perspective view of the mirror box assembly, viewed obliquely from behind the mirror box assembly.

FIG. 4 is an exploded perspective view of portions of the mirror box assembly 20, and FIG. 5 is a perspective view of the mirror box assembly 20, viewed obliquely from behind the mirror box assembly 20. As shown in FIGS. 2 through 5, a quick-return mirror (main mirror) 22 is installed in the mirror box 21. A pentagonal prism 23, a photometering sensor 24, and an eyepiece optical system 29 are mounted on top of the mirror box 21, and an AF drive mechanism (camera mechanism) 25 including an AF motor 25a is fixed to a bottom portion of the mirror box 21 by set screws 251 (shown in FIG. 4). A shutter unit (shutter mechanism/camera mechanism) 26 including a focal-plane shutter and a shutter drive mechanism is fixed to the back of the mirror box 21 by set screws 261, while a diaphragm drive mechanism (camera mechanism) 27 and a mirror-drive/shatter-charge mechanism 28 including a mirror-drive/shutter-charge motor 28a for driving the main mirror 22 are fixed to a left side face of the mirror box 21 by set screws 281. The mirror box 21, the AF drive mechanism 25, the shutter unit 26, the diaphragm drive mechanism 27 and the mirror-drive/shatter-charge mechanism 28 are elements of the mirror box assembly 20. The mirror box assembly 20 is mounted on top of the bottom plate 12 of the main frame 10 that is positioned in front of the back plate 11 of the main frame 10, and is supported by the back plate 11 and the bottom plate 12 at a plurality of points by a plurality of shock absorbers (vibration isolation member) 15.

As shown in a vertical cross sectional view of the mirror box assembly 20 in FIG. 6, taken along a vertical plane at a substantially center of the mirror box assembly 20 in a lateral direction thereof, the CCD unit 30 is positioned behind the shutter unit 26, which is positioned on the back of the mirror box 21, and is fixed to the back of the mirror box 21 to be supported thereby. The CCD unit 30 is provided on a CCD base plate 31 thereof with a CCD chip (CCD image sensor) 32 serving as an image pick-up device. As shown in FIG. 5, two electrode arrays 32a of the CCD chip 32 project rearward from the CCD base plate 31 through two slots 33 formed on the CCD base plate 31. The CCD base plate 31 is provided with three adhesive injection holes 34 into which a bonding agent is injected to cement the CCD chip to the CCD base plate 31. The CCD base plate 31 is provided with three adjusting screw holes into which disk-shaped (button-shaped) adjusting screws 35 for adjusting the angle of the CCD chip 32 with respect to the CCD base plate 31 are screwed from behind the CCD base plate 31.

As shown in FIG. 4, the CCD unit 30 is fixed to the mirror box 21 to be integral therewith by set screws 261 with cylindrical spacers 262 that are positioned between the CCD base plate 31 and the shutter unit 26; each set screw 261 is screwed into the back of the mirror box 21 through the CCD base plate 31 and the associated spacer 262 to be fixed to the CCD base plate 31. Accordingly, the CCD unit 30 is integrally supported by the mirror box 21 with a predetermined gap secured between the CCD unit 30 and the shutter unit 26 in the optical axis direction.

As shown in FIG. 2, a bottom decorative bottom member 13 that serves as a bottom cover of the camera body 1 is fixed to the bottom plate 12 of the main frame 10 to be integral therewith. As shown in FIGS. 3, 8A and 8B, the tripod socket 14 accessible through a hole formed on the decorative bottom member 13 is fixed to a bottom surface of the bottom plate 12. A mounting screw (male screw) of a tripod (not shown) is screwed into the tripod socket 14 when the digital camera 100 is mounted on the pan head (camera platform) of the tripod. This structure is well-known in the art, and will not be hereinafter discussed in detail.

Figure 7A:
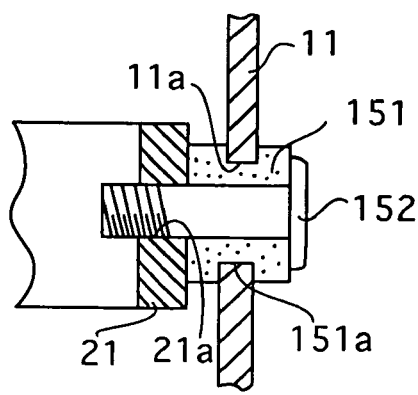
FIG. 7A is a cross sectional view taken along the A—A line shown in FIG. 2.
Figure 7B:
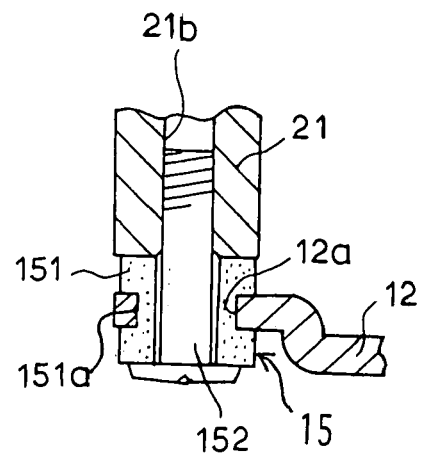
FIG. 7B is a cross sectional view taken along the B—B line shown in FIG. 2.

The mirror box assembly 20 is supported on the back plate 11 and the bottom plate 12 by the plurality of shock absorbers 15. Specifically, the mirror box assembly 20 is fixed to the back plate 11 at four points (an upper left point, an upper right point, a lower left point and a lower right point) on the back of the mirror box assembly 20 by four shock absorbers 15, and is further fixed to the bottom plate 12 at two points on the bottom of the mirror box assembly 20 by another two shock absorbers 15. Referring to FIGS. 2, 7A and 7B, each shock absorber 15 is formed in a hollow cylindrical shape, and made of a shock-absorbable resilient material such as rubber or relatively soft resin. Each shock absorber 15 consists of a bush (resilient member) 151 and a long screw (connecting device) 152. Each bush 151 is provided, on an outer peripheral surface thereof at a center in the axial direction of the bush 151, with an annular groove 151a, and each screw 152 is longer in length than the associated bush 151.

In the four shock absorbers 15 on the back plate 11, each bush 151 is fitted into an associated fixing hole 11a formed on the back plate 11 so that the inner edge of the fixing hole 11a is engaged in the annular groove 151a of the bush 151 as shown in FIG. 7A. After the associated bush 151 is fitted into the associated fixing hole 11a in such a manner, one screw 152 is inserted into the central hole of the bush 151 from behind the back plate 11, and the threaded tip portion of the screw 152 is screwed into an associated screw hole 21a formed on the back of the mirror box 21.

In the two shock absorbers 15 on the bottom plate 12, each bush 151 is fitted into an associated fixing hole 12a formed on the bottom plate 12 so that the inner edge of the fixing hole 12a is engaged in the annular groove 151a of the bush 151 as shown in FIG. 7B. After the associated bush 151 is fitted into the associated fixing hole 12a in such a manner, one screw 152 is inserted into the central hole of the bush 151 from below the bottom plate 12, and the threaded tip portion of the screw 152 is screwed into an associated screw hole 21b formed on the bottom of the mirror box 21. Due to this mirror-box supporting structure, the mirror box assembly 20 is supported by the main frame 10 in a shock-absorbable manner via the resilient bushes 151 that are resiliently deformable and movable relative to the back plate 11 or the bottom plate 12.

In the above described embodiment of the digital camera 100, if a mounting screw of a tripod (not shown) is screwed into the tripod socket 14 so that the digital camera 100 is fixedly mounted on the pan head of the tripod, an external force is exerted on the mounting screw of the tripod and also on the bottom plate 12, to which the mounting screw is fixed via the tripod socket 14, due to the tightening force of the mounting screw against the tripod socket 14. FIG. 8A shows a schematic diagram of the structure shown in FIG. 2 in a state in which no external force is exerted on the bottom plate 12. In this state shown in FIG. 8A, if the mounting screw of the tripod which is screwed into the tripod socket 14 is tightened to a degree that an external force is exerted on the bottom plate 12, the bottom plate 12 is deformed as shown by chain lines in FIG. 8B. At this time, the back plate 11 is not deformed due to the rigidity of the bottom plate 12 if the external force exerted on the bottom plate 12 is somewhat small. However, if the external force is excessively large, the back plate 11, together with the bottom plate 12, is deformed, and consequently the bottom plate 12 bends while the back plate 11 tilts as shown by chain lines in FIG. 8B.

Such deformations of the main frame 10 would cause the mirror box assembly 20, which is supported by the main frame 10, to be deformed if the mirror box assembly 20 is directly supported by the main frame 10. However, even if such deformations of the main frame 10 occur, the bush 151 of each shock absorber 15 is resiliently deformed to absorb the external force transmitted from the tripod socket 14 so that no external force is transmitted to the mirror box assembly 20, thus preventing the mirror box unit 20 from being deformed. Accordingly, neither the front surface of the lens mount 2, which is fixed to the front of the mirror box unit 20, nor the imaging surface (sensitive surface) of the CCD chip 32 in the CCD unit 30, which is fixed to the back of the mirror box assembly 20, is tilted by the external force exerted on the tripod socket 14. Consequently, the front surface of the lens mount 2 is held to lie in a plane orthogonal to a photographing optical axis O (see FIG. 8A), so that no defocusing occurs on the imaging surface of the CCD chip 32 to thereby make high-quality imaging operation possible.

In the above illustrated embodiment of the digital camera, there is a possibility of the main frame 10 vibrating when impact or shock is applied to the camera body 1. Nevertheless, even if impact or shock is applied to the camera body 1, the mirror box assembly 20 is prevented from vibrating because each shock absorber 15, via which the mirror box assembly 20 is supported by the main frame 10, absorbs such impact or shock. Therefore, even if vibration occurs upon an operation of the release button 4 at a time of exposure, the mirror box assembly 20 is prevented from vibrating, and accordingly blurred object images can be prevented from being produced in capturing object images in the CCD unit 30, which makes high-quality imaging operation possible.

Furthermore, mechanical vibrations which are created by operations of the AF drive mechanism 25 and the mirror-drive/shutter-charge mechanism 28 that are installed on the mirror box assembly 20 are prevented from being transmitted to the main frame 10 due to the shock absorbers 15. Accordingly, even if such mechanical vibrations are created, the main frame 10 does not vibrate sympathetically with the mirror box assembly 20, so that no sound of vibrations are produced from the camera body 1, which makes a quiet imaging operation possible.

Figure 9A:
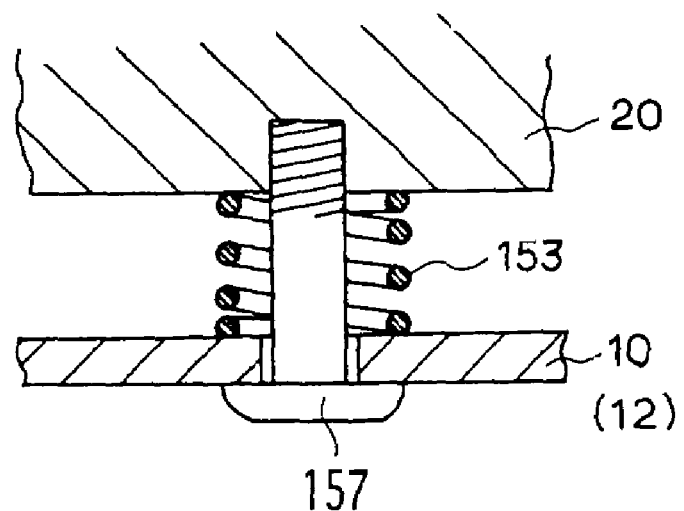
FIG. 9A is a cross sectional view of another embodiment of a shock-absorber.

Although each shock absorber 15 consists of one bush 151 and one long screw 152 that extends through the bush 151 in the above illustrated embodiment of the digital camera, the bush 151 can be replaced by a spring. For instance, each bush 151 can be replaced by a compression coil spring (resilient member) 153 which is installed between the mirror box 20 and the main frame 10 while each screw (connecting device) 157 can be screwed into the mirror box 20 with the screw 157 passing through the associated compression coil spring 153 to fix the mirror box 20 to the main frame 10 so that the mirror box assembly 20 is supported by the main frame 10 in a suspended fashion as shown in FIG. 9A (only one compression coil spring 153 is shown in FIG. 9A). With this structure, deformations or vibrations of the main frame 10 are absorbed by the resiliency of the compression coil springs 153, and accordingly, the mirror box assembly 20 is prevented from vibrating or being deformed. Consequently, in-focus/non-blurry high-quality object images can be captured. Although not illustrated in the drawings, a leaf spring can be used as a substitute for the compression coil spring 153.

Figure 9B:
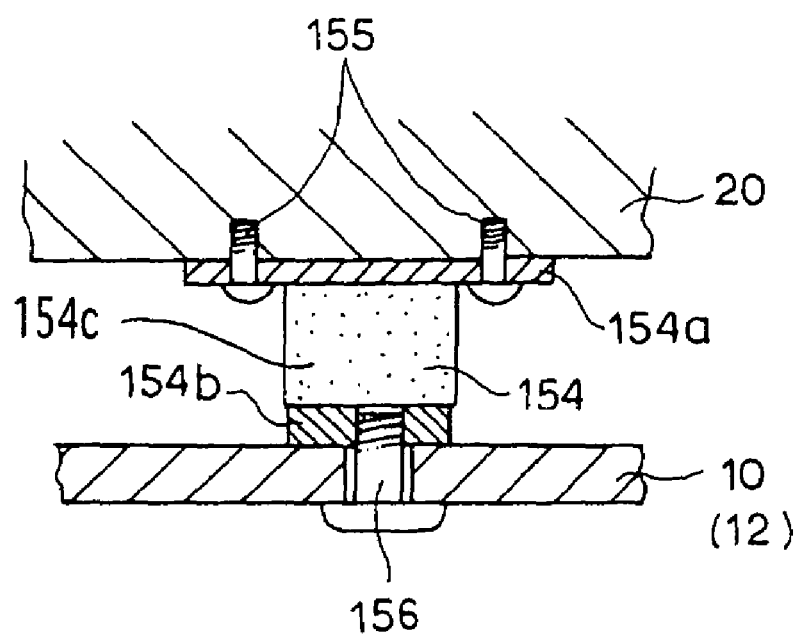
FIG. 9B is a cross sectional view of another embodiment of the shock-absorber.
Figure 10A:
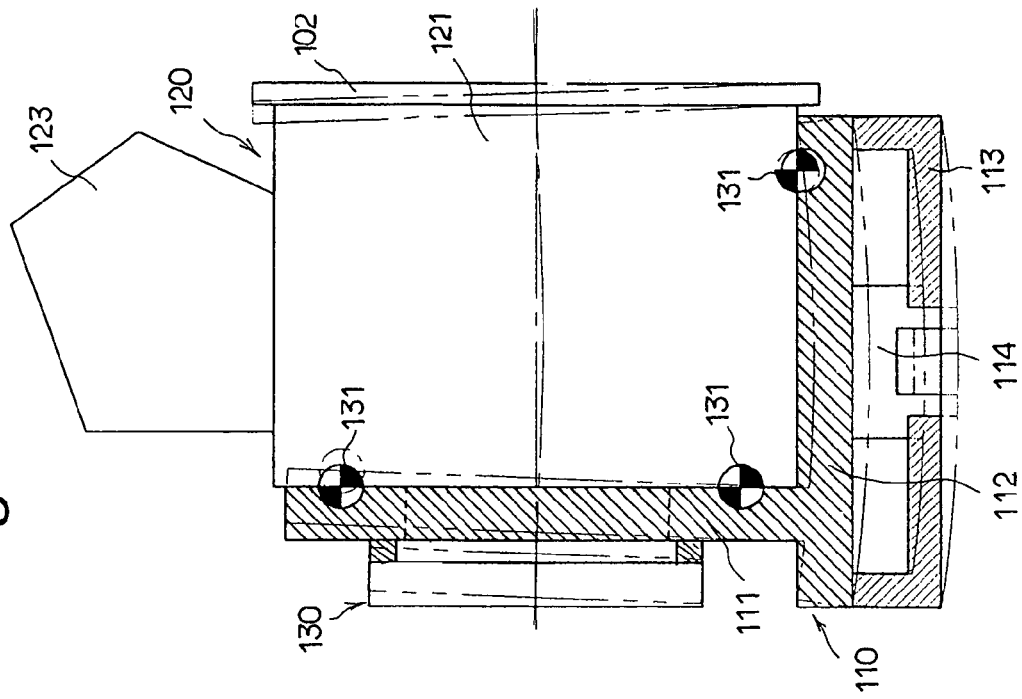
FIGS. 10A and 10B are schematic diagrams illustrating a process of the occurrence of defocusing in a conventional digital camera.
Figure 10B:
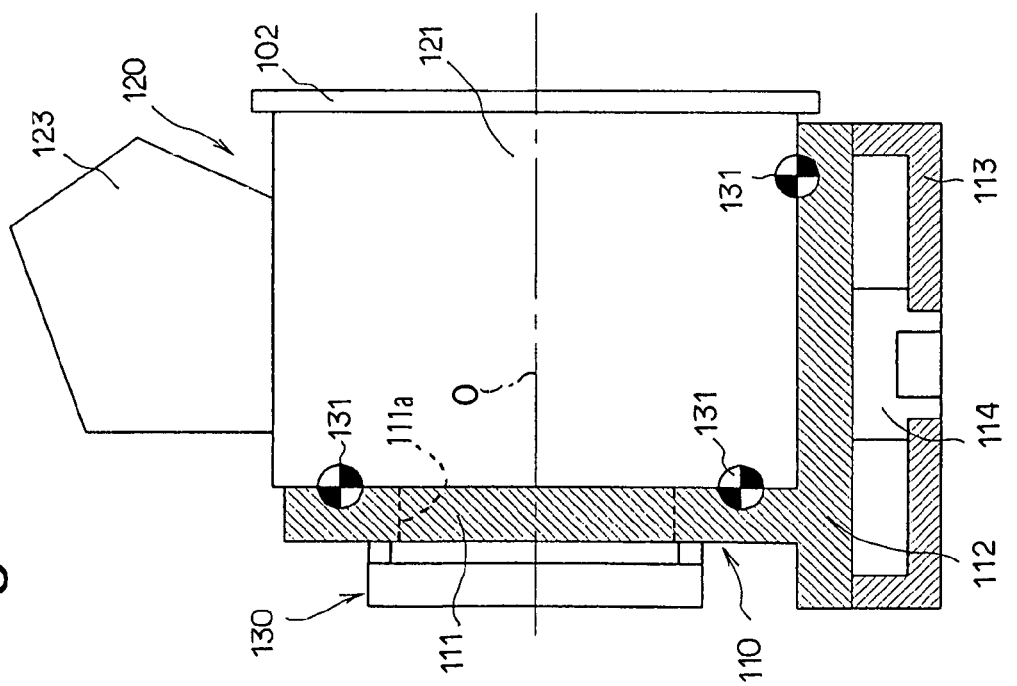

Instead of the shock absorber using either the bush 151 or the compression coil spring 153, the shock absorber using a bush (resilient member) 154 can be used as shown in FIG. 9B. The bush 154 consists of a solid column 154c made of a resilient material such as rubber or resin, and two end metal plates (hard plates/connecting devices) 154a and 154b which are joined or cemented to the opposite ends of the solid column 154c, respectively. The bush 154 can be installed by fixing the end metal plate 154a to the mirror box 20 with set screws (connecting device) 155 while fixing the end metal plate 154b to the main frame 10 with a set screw (connecting device) 156, with the bush 154 positioned between the mirror box 20 and the main frame 10 as shown in FIG. 9B.

Although the CCD image sensor (CCD chip 32) is used as an image pick-up device in the above illustrated embodiment of the digital camera, the CCD image sensor can be replaced by any other solid-state image pick-up device such as a CMOS image sensor. In addition, the present invention can be applied to not only a digital camera but also a conventional camera using sensitive film. In this case, a mirror box only has to be supported by a main frame of the camera in the same manner as the above illustrated embodiment of the digital camera.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:
   a mirror box to which a photographing lens is mounted, an object image being formed on one of an image pick-up device and sensitive film via said photographing lens;
   a main frame, said mirror box being provided on said main frame; and
   a shock absorbing device,
   wherein said one of said image pick-up device and said sensitive film is supported by said mirror box, and
   wherein said mirror box is supported by said main frame via said shock absorbing device.

2. The camera according to claim 1, wherein said mirror box comprises a lens mount to which said photographing lens is mounted, at least one camera mechanism of said camera for performing a photographing operation, said camera mechanism being mounted to said mirror box to be integral therewith.

3. The camera according to claim 1, wherein said main frame comprises:
   a back plate lying in a plane orthogonal to an optical axis of said photographing lens; and
   a bottom plate which extends in said optical axis direction,
   wherein said mirror box is supported by both said back plate at a plurality of points thereon and said bottom plate at a plurality of points thereon via said shock absorbing device.

4. The camera according to claim 1, wherein said shock absorbing device comprises:

a resilient member positioned between said mirror box and said main frame; and a connecting device which connects said resilient member to each of said mirror box and said main frame so that said resilient member remains positioned between said mirror box and said main frame.

5. The camera according to claim 4, wherein said resilient member comprises a hollow cylindrical bush, and wherein said connecting device comprises a screw which passes through said hollow cylindrical bush and is screwed into said mirror box.

6. The camera according to claim 5, wherein an annular groove is formed on an outer peripheral surface of said hollow cylindrical bush, said hollow cylindrical bush being fitted into a fixing hole formed on said main frame so that an inner edge of said fixing hole is engaged in said annular groove.

7. The camera according to claim 4, wherein said resilient member comprises a compression coil spring, and wherein said connecting device comprises a screw which passes through said compression coil spring and is screwed into said mirror box.

8. The camera according to claim 4, wherein said resilient member comprises a solid column, and wherein said connecting device comprises:

two end plates fixed to opposite ends of said solid column;

at least one first screw for fixing one of said two end plates to said mirror box; and at least one second screw for fixing the other of said two end plates to said main frame.

9. The camera according to claim 1, wherein said image pick-up device comprises one of a CCD image sensor and a CMOS image sensor.

10. The camera according to claim 1, further comprising a quick-return mirror installed in the mirror box.

11. The camera according to claim 1, wherein said shock absorbing device comprises a plurality of shock absorbers via which said mirror box is supported by said main frame at different points.

12. The camera according to claim 2, wherein said camera mechanism comprises at least one of an AF mechanism, a shutter mechanism and a diaphragm drive mechanism.

13. A digital camera comprising:

a main frame;

a mirror box installed on said main frame, and having a lens mount to which an interchangeable lens is detachably attached; and a plurality of shock absorbers positioned between said mirror box and said main frame so that said mirror box is supported by said main frame via said plurality of shock absorbers at different points.

* * * * *